(12) United States Patent
Lin (10) Patent No.: US 7,143,777 B2
(45) Date of Patent: Dec. 5, 2006

(54) CONTROL VALVE HAVING PRESSURE BALANCE EFFECT

(75) Inventor: Mei-Fen Lin, Changhua (TW)

(73) Assignee: Ing Tzon Co., Ltd., Chang Hua (TW)

( * ) Notice: Subject to any disclaimer, the term of this patent is extended or adjusted under 35 U.S.C. 154(b) by 269 days.

(21) Appl. No.: 10/894,517

(22) Filed: Jul. 20, 2004

(65) Prior Publication Data

US 2006/0016487 A1   Jan. 26, 2006

(51) Int. Cl.
*F16K 11/06* (2006.01)
*G05D 11/16* (2006.01)

(52) U.S. Cl. .................. 137/98; 137/454.6; 137/625.41

(58) Field of Classification Search .................. 137/98, 137/100, 454.6, 625.41, 625.46
See application file for complete search history.

(56) References Cited

U.S. PATENT DOCUMENTS

| | | | | |
|---|---|---|---|---|
| 3,780,758 A | * | 12/1973 | DeVries | 137/454.6 |
| 3,788,601 A | * | 1/1974 | Schmitt | 137/454.6 |
| 3,807,455 A | * | 4/1974 | Farrell | 137/454.6 |
| 3,921,659 A | * | 11/1975 | Rudewick, III | 137/98 |
| 5,725,010 A | * | 3/1998 | Marty et al. | 137/100 |
| 6,517,006 B1 | * | 2/2003 | Knapp | 137/625.41 |

* cited by examiner

*Primary Examiner*—Stephen M. Hepperle
(74) *Attorney, Agent, or Firm*—Alan D. Kamrath; Nikolai & Mersereau, P.A.

(57) ABSTRACT

A control valve includes a housing, two sealing gaskets, a shaft, a protective jacket, a fixed plate, a movable plate, a sleeve, a pressure balance unit, and an urging screwing member. Thus, the movable plate is rotated by operation of the shaft without producing deviation or loose displacement so as to balance the water pressure and control the water output and temperature exactly. In addition, the movable plate is driven by the shaft to rotate relative to the fixed plate without producing friction and wear between the movable plate and the fixed plate, thereby enhancing the lifetime of the control valve.

20 Claims, 6 Drawing Sheets

CONTROL VALVE HAVING PRESSURE BALANCE EFFECT

BACKGROUND OF THE INVENTION

1. Field of the Invention

The present invention relates to a control valve for a mixed water faucet, and more particularly to a control valve having a pressure balance effect.

2. Description of the Related Art

A conventional control valve for a mixed water faucet is provided with a pressure balance valve that can stop input of the hot water in the hot water pipe when the water pressure in the cold water pipe drops largely and can provide a pressure balance between the hot water and the cold water in a short period of time, thereby preventing a user from being hurt by the hot water during the shower process.

SUMMARY OF THE INVENTION

In accordance with the present invention, there is provided a control valve, comprising a housing, a shaft, a fixed plate, and a movable plate, wherein:

the housing has an inside formed with a shaft hole having a first end having a peripheral wall formed with a plurality of water outlet holes and an outside formed with a depression communicating with the water outlet holes of the shaft hole, the depression of the housing has a peripheral wall formed with two water inlet holes each communicating with the shaft hole;

the shaft is rotatably mounted in the shaft hole of the housing and has a first end protruding outward from the shaft hole of the housing and a second end formed with an abutting disk rested on a wall of the shaft hole of the housing;

the fixed plate is secured in the shaft hole of the housing and has a first side formed with a first water inlet channel and a second water inlet channel and a second side formed with a first water inlet port communicating with the first water inlet channel and a second water inlet port communicating with the second water inlet channel; and the movable plate is rotatably mounted in the shaft hole of the housing and has a first side secured on the shaft to rotate therewith and a second side having a peripheral wall formed with a water outlet channel communicating with the water outlet holes of the shaft hole and selectively aligning with either one of the first water inlet channel and the second water inlet channel of the fixed plate.

The primary objective of the present invention is to provide a control valve for a mixed water faucet, wherein the control valve has a pressure balance effect.

Another objective of the present invention is to provide a control valve, wherein the movable plate is rotated by operation of the shaft without producing deviation or loose displacement so as to balance the water pressure and control the water output and temperature exactly.

A further objective of the present invention is to provide a control valve, wherein the movable plate is driven by the shaft to rotate relative to the fixed plate without producing friction and wear between the movable plate and the fixed plate, thereby enhancing the lifetime of the control valve.

A further objective of the present invention is to provide a control valve, wherein the movable plate and the fixed plate have a smaller contact area, thereby preventing the movable plate from being choked or jammed due to impurities during a long-term utilization.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1–9, a control valve in accordance with the preferred embodiment of the present invention comprises a housing 10, two sealing gaskets 20, a shaft 30, a protective jacket 40, a fixed plate 60, a movable plate 50, a sleeve 70, a pressure balance unit 80, and an urging screwing member 90.

Figure 1:
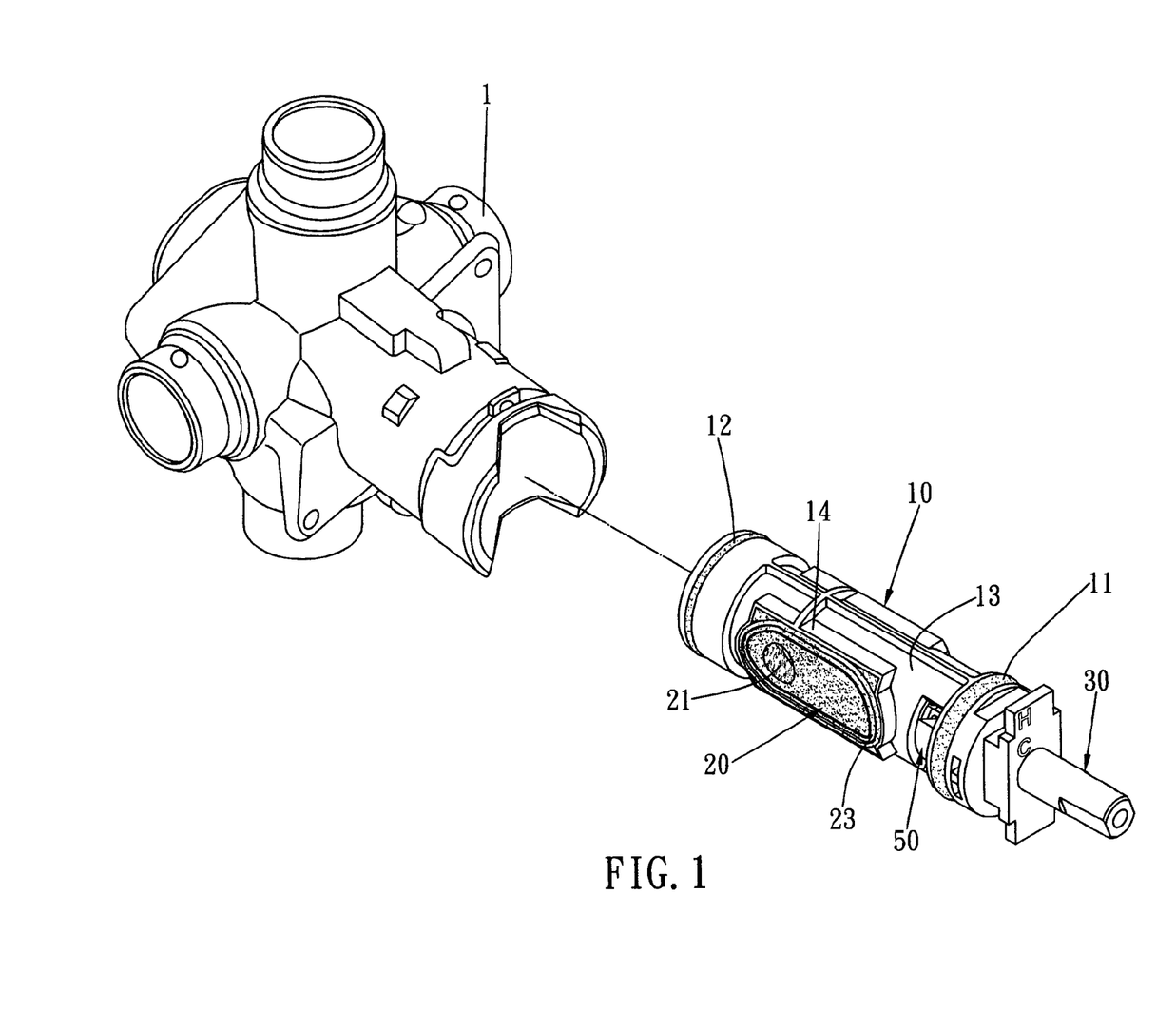
FIG. 1 is a perspective view of a control valve for a faucet in accordance with the preferred embodiment of the present invention.
Figures 2, 3:
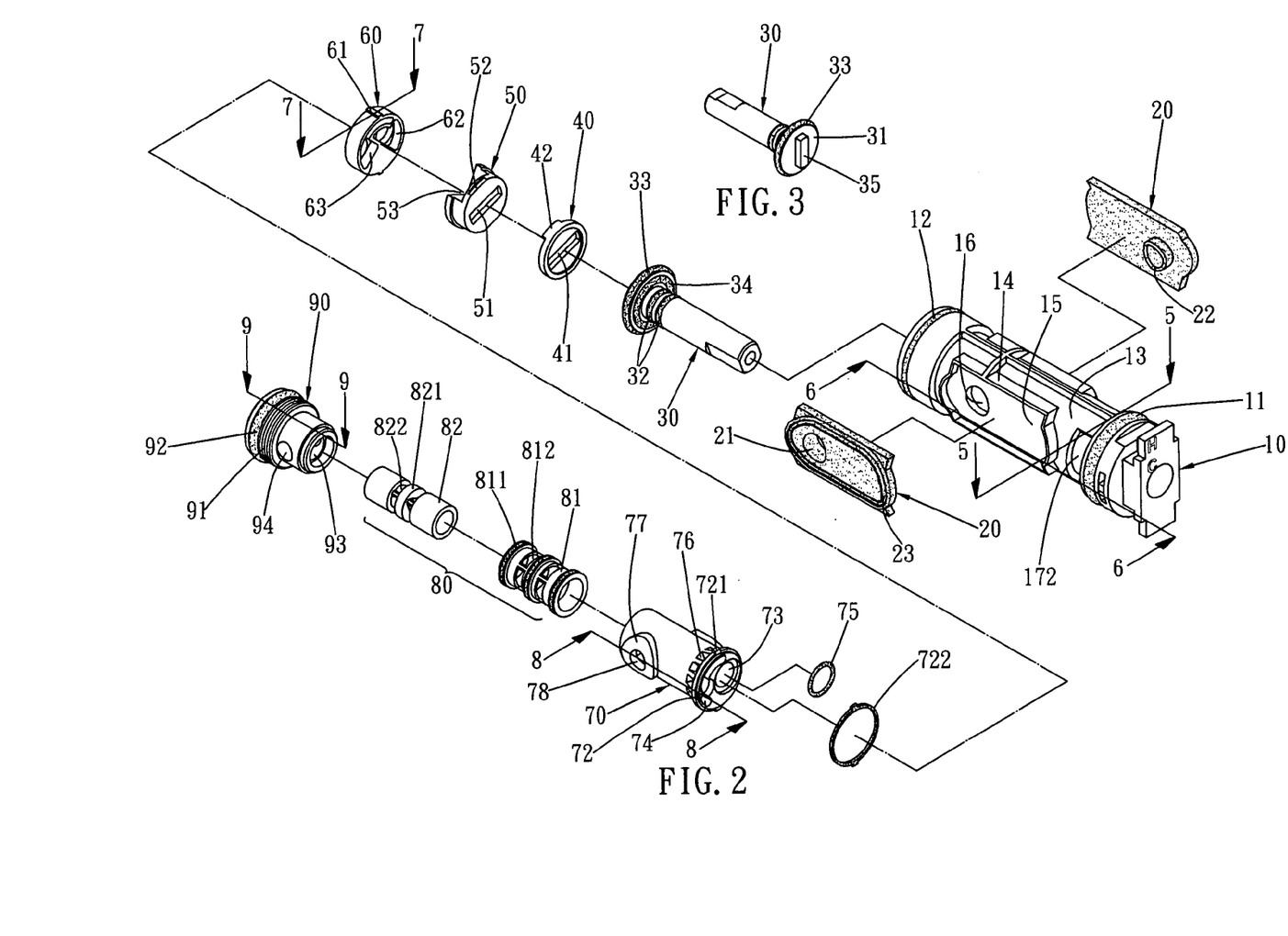
FIG. 2 is an exploded perspective view of the control valve as shown in FIG. 1.
FIG. 3 is a perspective view of a shaft of the control valve as shown in FIG. 2.
Figure 4:
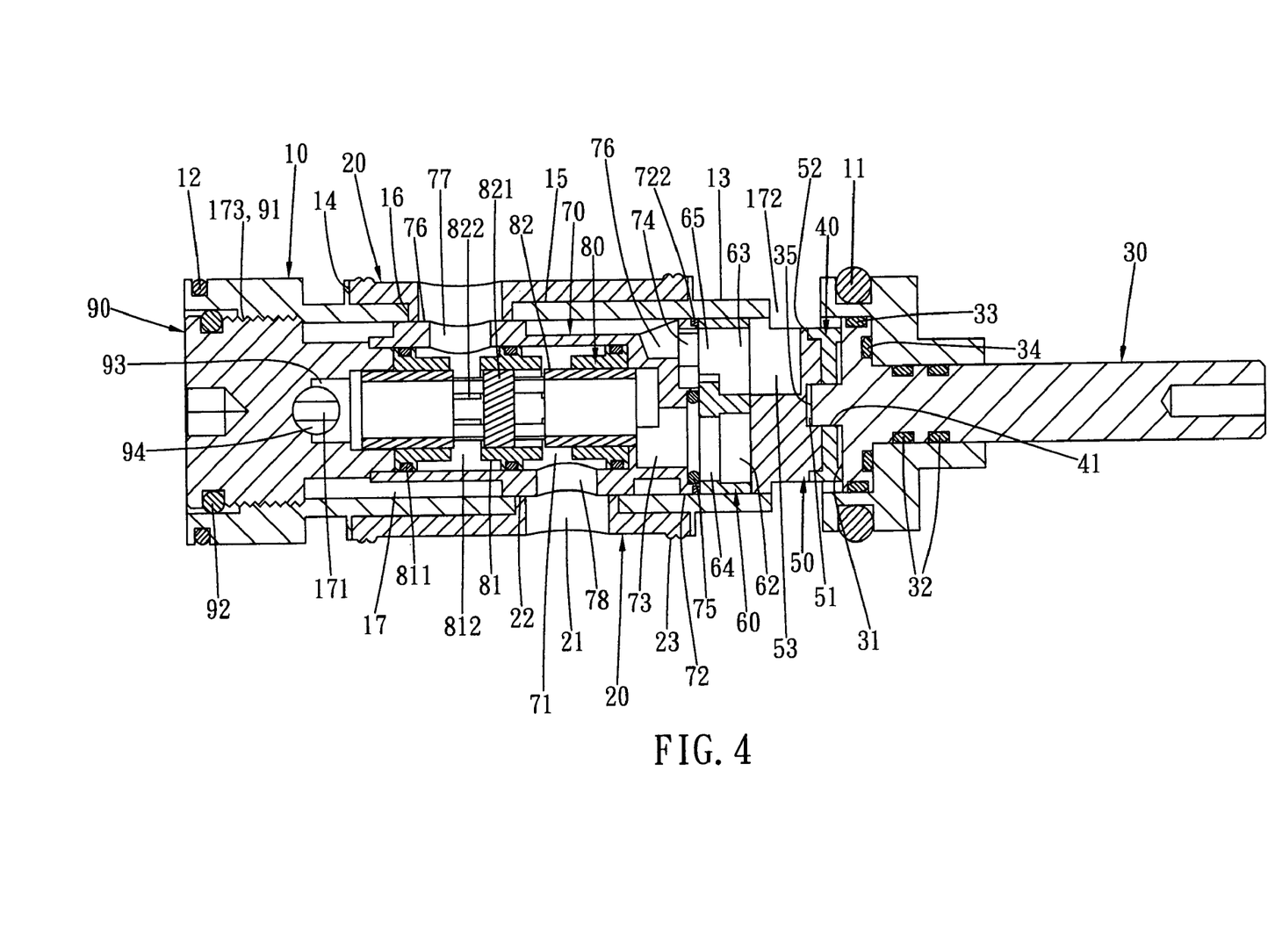
FIG. 4 is a front plan cross-sectional view of the control valve as shown in FIG. 1.
Figure 5:
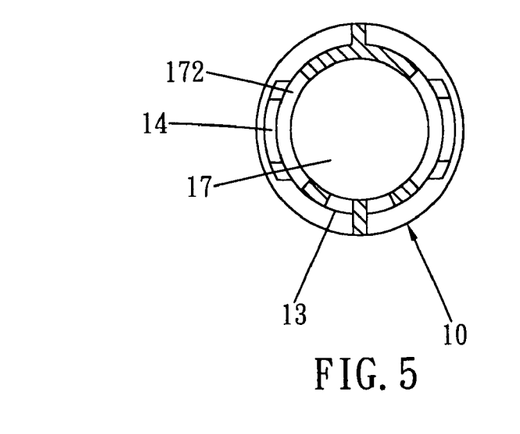
FIG. 5 is a plan cross-sectional view of the control valve taken along line 5—5 as shown in FIG. 2.
Figure 6:
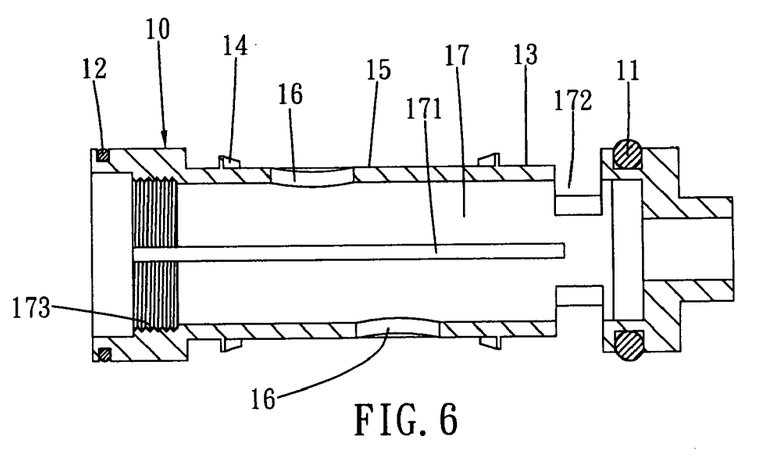
FIG. 6 is a plan cross-sectional view of the control valve taken along line 6—6 as shown in FIG. 2.
Figure 7:
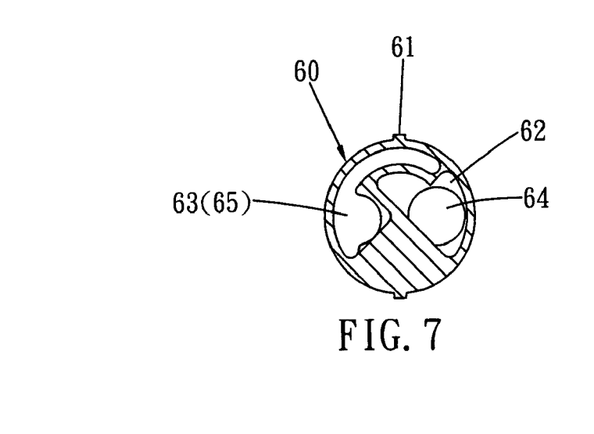
FIG. 7 is a plan cross-sectional view of the control valve taken along line 7—7 as shown in FIG. 2.

The housing 10 is cylindrical and has an inside formed with a triple-stepped shaft hole 17 (see FIG. 6) having a first end having a peripheral wall formed with a plurality of water outlet holes 172 (see FIG. 5) and a second end having a peripheral wall formed with an inner thread 173 (see FIG. 6). The shaft hole 17 of the housing 10 has a mediate portion having a peripheral wall formed with two radially opposite positioning grooves 171 (see FIG. 6). The housing 10 has an outside formed with a depression 13 communicating with the water outlet holes 172 of the shaft hole 17. The outside of the housing 10 has a first end provided with a first O-ring 11 and a second end provided with a second O-ring 12. The depression 13 of the housing 10 has a peripheral wall formed with two water inlet holes 16 (see FIG. 6) each communicating with the shaft hole 17 and two radially opposite protruding frames 14 each having an inside formed with a receiving recess 15. Preferably, the water inlet holes 16 of the housing 10 are arranged in a staggered manner.

Each of the two sealing gaskets 20 is mounted on the housing 10 and has an end formed with a water inlet hole 21 communicating with the shaft hole 17 of the housing 10. The water inlet hole 21 of each of the two sealing gaskets 20 has a peripheral wall formed with an annular insert 22 mounted in a respective one of the water inlet holes 16 of the housing 10. Each of the two sealing gaskets 20 is mounted in the receiving recess 15 of a respective one of the two frames 14 of the housing 10 and has a side having a peripheral wall formed with a loop-shaped sealing flange 23.

The shaft 30 is rotatably mounted in the shaft hole 17 of the housing 10 and has a first end protruding outward from the shaft hole 17 of the housing 10 and a second end formed with an abutting disk 31 rested on a wall of the shaft hole 17 of the housing 10. The second end of the shaft 30 is provided with two O-rings 32. The abutting disk 31 of the shaft 30 has a first side formed with an elongated drive rib 35 (see FIG. 3). The abutting disk 31 of the shaft 30 has a peripheral wall provided with a first O-ring 33 and a second side provided with a second O-ring 34.

The protective jacket 40 is secured on the abutting disk 31 of the shaft 30 to rotate therewith and has an inside formed with an elongated locking slot 41 mounted on the drive rib 35 of the abutting disk 31 of the shaft 30 so that the protective jacket 40 is secured on the abutting disk 31 of the shaft 30. The protective jacket 40 is made of ceramic material and has a circular shape. The protective jacket 40 has a peripheral wall formed with two radially opposite locking blocks 42.

The fixed plate 60 is secured in the shaft hole 17 of the housing 10 and has a first side formed with a first water inlet channel 62 and a second water inlet channel 63 and a second side formed with a first water inlet port 64 (see FIG. 7) communicating with the first water inlet channel 62 and a second water inlet port 65 (see FIG. 7) communicating with the second water inlet channel 63. The fixed plate 60 is made of ceramic material and has a circular shape. The fixed plate 60 has a peripheral wall formed with two radially opposite positioning blocks 61 each positioned in a respective one of the positioning grooves 171 of the housing 10.

The movable plate 50 is rotatably mounted in the shaft hole 17 of the housing 10 and has a first side secured on the shaft 30 to rotate therewith and a second side having a peripheral wall formed with a water outlet channel 53 communicating with the water outlet holes 172 of the shaft hole 17. The movable plate 50 is rotatable between a first position where the water outlet channel 53 of the movable plate 50 aligns with the first water inlet channel 62 of the fixed plate 60 and a second position where the water outlet channel 53 of the movable plate 50 aligns with the second water inlet channel 63 of the fixed plate 60. The movable plate 50 is made of ceramic material and has a stepped circular shape. The first side of the movable plate 50 is formed with an elongated locking recess 51 mounted on the drive rib 35 of the abutting disk 31 of the shaft 30 so that the movable plate 50 is secured on the abutting disk 31 of the shaft 30. The first side of the movable plate 50 is rested on the protective jacket 40 and has a peripheral wall formed with two radially opposite locking grooves 52 for locking the locking blocks 42 of the protective jacket 40, so that the movable plate 50 is fixed on the protective jacket 40 to move therewith.

Figures 8, 9:
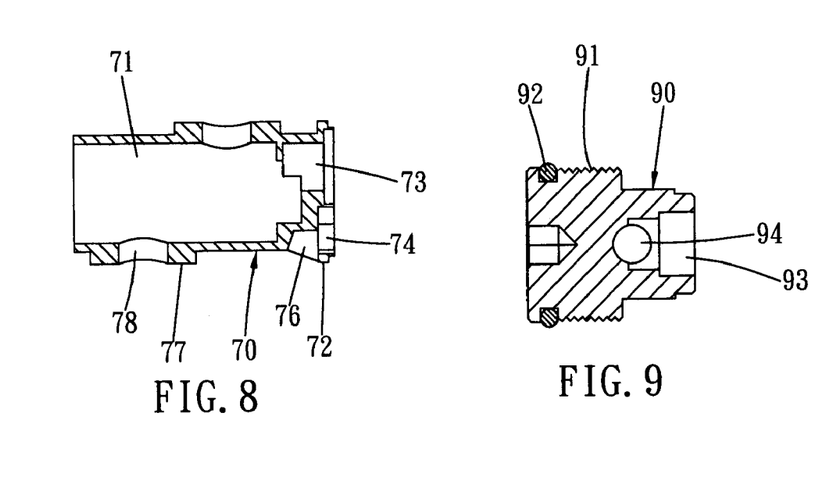
FIG. 8 is a plan cross-sectional view of the control valve taken along line 8—8 as shown in FIG. 2.
FIG. 9 is a plan cross-sectional view of the control valve taken along line 9—9 as shown in FIG. 2.

The sleeve 70 is secured in the housing 10 and has an inside formed with a stepped valve chamber 71 (see FIG. 8). The sleeve 70 has a peripheral wall formed with two lugs 77 each formed with a water inlet bore 78 communicated with the valve chamber 71 and connected to a respective one of the water inlet holes 16 of the housing 10 and the water inlet hole 21 of a respective one of the two sealing gaskets 20. Preferably, the lugs 77 of the sleeve 70 are arranged in a manner. The sleeve 70 has a first end having a peripheral wall formed with a plurality of chutes 76 communicated with the shaft hole 17 of the housing 10 and having an inside formed with a first water outlet port 73 communicated with the valve chamber 71 and connected to the first water inlet port 64 of the fixed plate 60 and a second water outlet port 74 communicated with the chutes 76 and connected to the second water inlet port 65 of the fixed plate 60. The first end of the sleeve 70 is formed with an enlarged head 72 rested on the fixed plate 60 and having a peripheral wall formed with two radially opposite positioning blocks 721 each positioned in a respective one of the positioning grooves 171 of the housing 10. An O-ring 722 is mounted on an end face of the enlarged head 72 of the sleeve 70, and an O-ring 75 is mounted in the first water outlet port 73 of the sleeve 70.

The pressure balance unit 80 is mounted in the valve chamber 71 of the sleeve 70 and includes a tubular bushing 81 having a peripheral wall formed with a plurality of arc-shaped grooves 812 communicated with the valve chamber 71 of the sleeve 70 and provided with a plurality of O-rings 811, and a tubular spindle 82 movably mounted in the bushing 81 and having a peripheral wall formed with two annular grooves 822 communicated with the grooves 812 of the bushing 81 and a baffle 821 located between the two annular grooves 822.

The urging screwing member 90 is secured in the housing 10 and urged on a second end of the sleeve 70 and the bushing 81 of the pressure balance unit 80. The urging screwing member 90 has a stepped shape and an inside formed with a conducting chamber 93 communicated with the valve chamber 71 of the sleeve 70 and a peripheral wall formed with two radially opposite conducting holes 94 each communicated with the conducting chamber 93. The urging screwing member 90 has an outer wall formed with an outer thread 91 screwed into the inner thread 173 of the housing 10 and provided with an O-ring 92.

Figure 10:
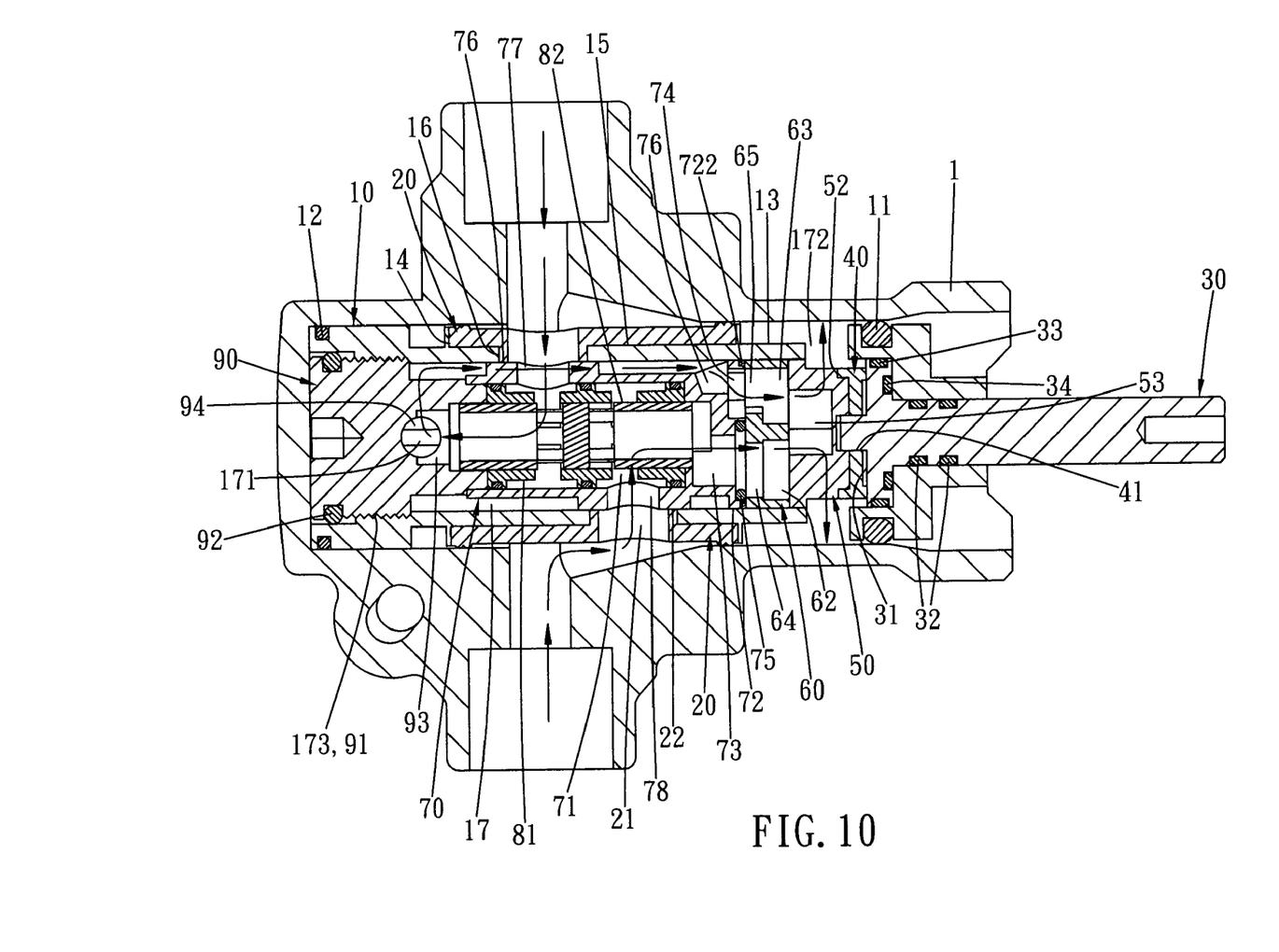
FIG. 10 is a schematic operational view of the control valve as shown in FIG. 4 in use.

In operation, referring to FIGS. 10–14 with reference to FIGS. 1–9, the control valve is mounted in a faucet body 1, with the cold water and the hot water from the faucet body 1 respectively flowing through the water inlet holes 21 of the sealing gaskets 20 and the water inlet bores 78 of the sleeve 70 into the valve chamber 71 of the sleeve 70 as shown in FIG. 10. Then, the water is balanced by the pressure balance unit 80. Then, the hot water in turn flows through the first water outlet port 73 of the sleeve 70 and the first water inlet port 64 of the fixed plate 60 into the first water inlet channel 62 of the fixed plate 60 as shown in FIG. 10. At the same time, the cold water in turn flows through the conducting chamber 93 and the conducting holes 94 of the urging screwing member 90, a gap between the sleeve 70 and the shaft hole 17 of the housing 10, the chutes 76 and the second water outlet port 74 of the sleeve 70, and the second water inlet port 65 of the fixed plate 60 into the second water inlet channel 63 as shown in FIG. 10.

When the shaft 30 is rotated by a faucet handle (not shown), the movable plate 50 is rotated by the shaft 30, so that the water outlet channel 53 is moved with the movable plate 50 to change the position of the water outlet channel 53 of the movable plate 50.

Figure 11:
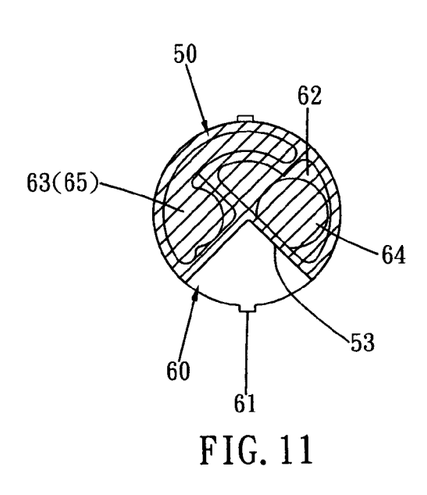
FIG. 11 is a schematic side plan cross-sectional operational view of the control valve as shown in FIG. 1.

As shown in FIG. 11, the water outlet channel 53 of the movable plate 50 does not align with the first water inlet channel 62 and the second water inlet channel 63 of the fixed plate 60, thereby stopping the water input.

Figure 12:
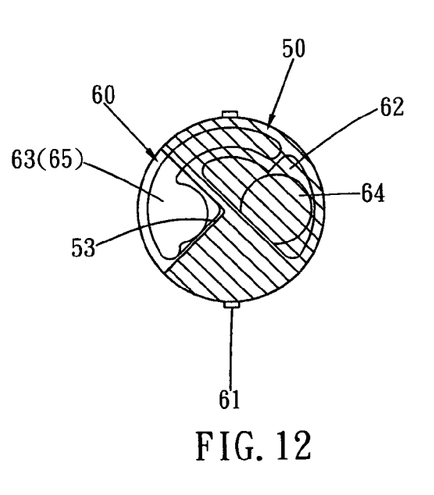
FIG. 12 is a schematic operational view of the control valve as shown in FIG. 11.

As shown in FIG. 12, the water outlet channel 53 of the movable plate 50 aligns with the second water inlet channel 63 of the fixed plate 60, thereby allowing output of the cold water.

Figure 13:
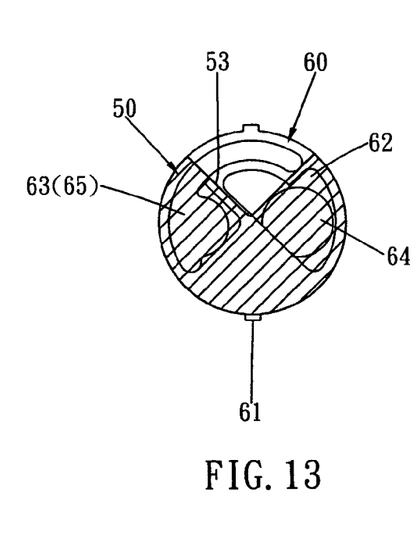
FIG. 13 is a schematic operational view of the control valve as shown in FIG. 11.

As shown in FIG. 13, the water outlet channel 53 of the movable plate 50 is connected to the first water inlet channel 62 and the second water inlet channel 63 of the fixed plate 60, thereby allowing output of the cold water and the hot water.

Figure 14:
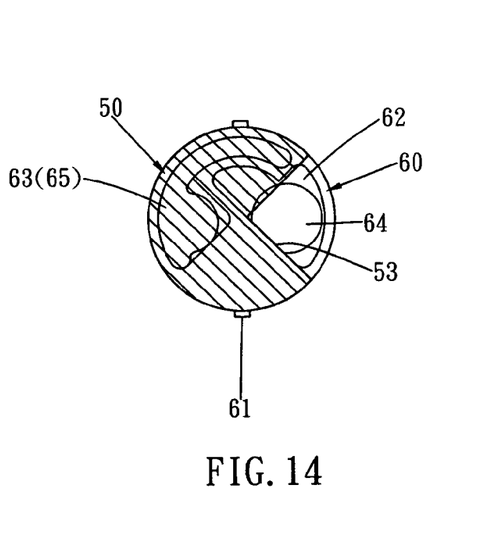
FIG. 14 is a schematic operational view of the control valve as shown in FIG. 11.

As shown in FIG. 14, the water outlet channel 53 of the movable plate 50 aligns with the first water inlet channel 62 of the fixed plate 60, thereby allowing output of the hot water.

In such a manner, the water source having a proper temperature controlled by switch of the movable plate 50 by operation of the shaft 30 flows through the water outlet channel 53 of the movable plate 50, the water outlet holes 172 of the shaft hole 17 and the depression 13 of the housing 10 and flows outward from the faucet body 1 or a shower head (not shown).

Accordingly, the movable plate 50 is rotated by operation of the shaft 30 without producing deviation or loose displacement so as to balance the water pressure and control the water output and temperature exactly. In addition, the movable plate 50 is driven by the shaft 30 to rotate relative to the fixed plate 60 without producing friction and wear between the movable plate 50 and the fixed plate 60, thereby enhancing the lifetime of the control valve. Further, the movable plate 50 and the fixed plate 60 have a smaller contact area, thereby preventing the movable plate 50 from being jammed or choked due to impurities during a long-term utilization.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A control valve, comprising a housing, a shaft, a fixed plate, and a movable plate, wherein:
   the housing has an inside formed with a shaft hole having a first end having a peripheral wall formed with a plurality of water outlet holes and an outside formed with a depression communicating with the water outlet holes of the shaft hole, the depression of the housing has a peripheral wall formed with two water inlet holes each communicating with the shaft hole;
   the shaft is rotatably mounted in the shaft hole of the housing and has a first end protruding outward from the shaft hole of the housing and a second end formed with an abutting disk rested on a wall of the shaft hole of the housing;
   the fixed plate is secured in the shaft hole of the housing and has a first side formed with a first water inlet channel and a second water inlet channel and a second side formed with a first water inlet port communicating with the first water inlet channel and a second water inlet port communicating with the second water inlet channel; and
   the movable plate is rotatably mounted in the shaft hole of the housing and has a first side secured on the shaft to rotate therewith and a second side having a peripheral wall formed with a water outlet channel communicating with the water outlet holes of the shaft hole and selectively aligning with either one of the first water inlet channel and the second water inlet channel of the fixed plate.

2. The control valve in accordance with claim 1, wherein the movable plate is rotatable between a first position where the water outlet channel of the movable plate aligns with the first water inlet channel of the fixed plate and a second position where the water outlet channel of the movable plate aligns with the second water inlet channel of the fixed plate.

3. The control valve in accordance with claim 1, wherein the abutting disk of the shaft has a first side formed with an elongated drive rib, the first side of the movable plate is formed with an elongated locking recess mounted on the drive rib of the abutting disk of the shaft so that the movable plate is secured on the abutting disk of the shaft, and the control valve further comprises a protective jacket secured on the abutting disk of the shaft to rotate therewith and having an inside formed with an elongated locking slot mounted on the drive rib of the abutting disk of the shaft so that the protective jacket is secured on the abutting disk of the shaft.

4. The control valve in accordance with claim 3, wherein the protective jacket has a peripheral wall formed with two radially opposite locking blocks, and the first side of the movable plate is rested on the protective jacket and has a peripheral wall formed with two radially opposite locking grooves for locking the locking blocks of the protective jacket, so that the movable plate is fixed on the protective jacket to move therewith.

5. The control valve in accordance with claim 1, wherein the shaft hole of the housing has a mediate portion having a peripheral wall formed with two radially opposite positioning grooves, and the fixed plate has a peripheral wall formed with two radially opposite positioning blocks each positioned in a respective one of the positioning grooves of the housing.

6. The control valve in accordance with claim 1, further comprising a sleeve secured in the housing and having an inside formed with a valve chamber, wherein the sleeve has a peripheral wall formed with two lugs each formed with a water inlet bore communicated with the valve chamber and connected to a respective one of the water inlet holes of the housing, the sleeve has a first end having a peripheral wall formed with a plurality of chutes communicated with the shaft hole of the housing and having an inside formed with a first water outlet port communicated with the valve chamber and connected to the first water inlet port of the fixed plate and a second water outlet port communicated with the chutes and connected to the second water inlet port of the fixed plate.

7. The control valve in accordance with claim 6, further comprising two sealing gaskets each mounted on the housing and each having an end formed with a water inlet hole communicating with the shaft hole of the housing, wherein the water inlet bore of each of the two lugs of the sleeve is connected to the water inlet hole of a respective one of the two sealing gaskets.

8. The control valve in accordance with claim 7, wherein the water inlet hole of each of the two sealing gaskets has a peripheral wall formed with an annular insert mounted in a respective one of the water inlet holes of the housing.

9. The control valve in accordance with claim 7, wherein the peripheral wall of the depression of the housing is formed with two radially opposite protruding frames each having an inside formed with a receiving recess, and each of the two sealing gaskets is mounted in the receiving recess of a respective one of the two frames of the housing and has a side having a peripheral wall formed with a loop-shaped sealing flange.

10. The control valve in accordance with claim 6, wherein the shaft hole of the housing has a mediate portion having a peripheral wall formed with two radially opposite positioning grooves, and the first end of the sleeve is formed with an enlarged head rested on the fixed plate and having a peripheral wall formed with two radially opposite positioning blocks each positioned in a respective one of the positioning grooves of the housing.

11. The control valve in accordance with claim 6, further comprising a pressure balance unit mounted in the valve chamber of the sleeve and including a tubular bushing having a peripheral wall formed with a plurality of arc-shaped grooves communicated with the valve chamber of the sleeve, and a tubular spindle movably mounted in the bushing and having a peripheral wall formed with two annular grooves communicated with the grooves of the bushing and a baffle located between the two annular grooves.

12. The control valve in accordance with claim 6, further comprising an urging screwing member secured in the housing and urged on a second end of the sleeve and the pressure balance unit.

13. The control valve in accordance with claim 12, wherein the urging screwing member has an inside formed with a conducting chamber communicated with the valve chamber of the sleeve and a peripheral wall formed with two radially opposite conducting holes each communicated with the conducting chamber.

14. The control valve in accordance with claim 12, wherein the shaft hole of the housing has a second end having a peripheral wall formed with an inner thread, and the urging screwing member has an outer wall formed with an outer thread screwed into the inner thread of the housing.

15. The control valve in accordance with claim 1, wherein the water inlet holes of the housing are arranged in a staggered manner.

16. The control valve in accordance with claim 6, wherein the lugs of the sleeve are arranged in a manner.

17. The control valve in accordance with claim 1, wherein the shaft hole of the housing has a triple-stepped shape.

18. The control valve in accordance with claim 1, wherein the valve chamber of the sleeve has a stepped shape.

19. The control valve in accordance with claim 1, wherein the movable plate is made of ceramic material and has a stepped circular shape.

20. The control valve in accordance with claim 1, wherein the fixed plate 60 is made of ceramic material and has a circular shape.

* * * * *